US011561027B2

(12) United States Patent
Ladd et al.

(10) Patent No.: US 11,561,027 B2
(45) Date of Patent: Jan. 24, 2023

(54) SYSTEMS AND METHODS FOR IMPLEMENTING EJECTOR REFRIGERATION CYCLES WITH CASCADED EVAPORATION STAGES

(71) Applicant: Bechtel Energy Technologies & Solutions, Inc., Houston, TX (US)

(72) Inventors: David Ladd, Sugar Land, TX (US); Eckhard Groll, West Lafayette, IN (US); Riley Barta, Denver, CO (US); Davide Ziviani, West Lafayette, IN (US)

(73) Assignee: BECHTEL ENERGY TECHNOLOGIES & SOLUTIONS, INC., Houston, TX (US)

( * ) Notice: Subject to any disclaimer, the term of this patent is extended or adjusted under 35 U.S.C. 154(b) by 0 days.

(21) Appl. No.: 17/766,796

(22) PCT Filed: Dec. 3, 2020

(86) PCT No.: PCT/US2020/062972
§ 371 (c)(1),
(2) Date: Apr. 6, 2022

(87) PCT Pub. No.: WO2021/113423
PCT Pub. Date: Jun. 10, 2021

(65) Prior Publication Data
US 2022/0357078 A1 Nov. 10, 2022

Related U.S. Application Data

(60) Provisional application No. 62/943,542, filed on Dec. 4, 2019.

(51) Int. Cl.
*F25B 5/02* (2006.01)
*F25B 1/10* (2006.01)
(Continued)

(52) U.S. Cl.
CPC .................. *F25B 5/02* (2013.01); *F25B 1/10* (2013.01); *F25B 9/008* (2013.01); *F25B 41/20* (2021.01);
(Continued)

(58) Field of Classification Search
CPC .... F25B 5/02; F25B 9/008; F25B 9/08; F25B 9/10; F25B 41/20; F25B 41/31;
(Continued)

(56) References Cited

U.S. PATENT DOCUMENTS 6,550,265 B2 * 4/2003 Takeuchi ................ F25B 13/00
 62/191
6,574,987 B2 6/2003 Takeuchi et al.
(Continued)

FOREIGN PATENT DOCUMENTS

CN 111174453 A * 5/2020 ................ F25B 1/08
DE 10302356 A1 * 7/2003 ................ F25B 1/08
(Continued)

OTHER PUBLICATIONS

Young, Lee, International Search Report and Written Opinion for PCT App. No. PCT/US20/62972, dated Mar. 12, 2021, 8 pages, United States Patent and Trademark Office as the International Searching Authority, Alexandria, VA.
(Continued)

*Primary Examiner* — Miguel A Diaz
(74) *Attorney, Agent, or Firm* — Crain Caton and James; William P. Jensen (57) ABSTRACT

Systems and methods for implementing ejector refrigeration cycles with cascaded evaporation stages that utilize a pump to optimize operation of the ejector and eliminate the need for a compressor between the evaporation stages.

17 Claims, 6 Drawing Sheets

(51) Int. Cl.
 *F25B 41/20* (2021.01)
 *F25B 9/00* (2006.01)
 *F25B 41/31* (2021.01)

(52) U.S. Cl.
 CPC .......... *F25B 41/31* (2021.01); *F25B 2400/13* (2013.01); *F25B 2600/19* (2013.01); *F25B 2600/21* (2013.01); *F25B 2700/195* (2013.01); *F25B 2700/197* (2013.01); *F25B 2700/1933* (2013.01); *F25B 2700/21151* (2013.01); *F25B 2700/21163* (2013.01); *F25B 2700/21175* (2013.01)

(58) Field of Classification Search
 CPC .... F25B 1/10; F25B 2400/13; F25B 2600/19; F25B 2600/21; F25B 2700/1933; F25B 2700/195; F25B 2700/197; F25B 2700/21151; F25B 2700/21163; F25B 2700/21175; F25B 2341/0012; F25B 2341/0014
 See application file for complete search history.

(56) References Cited

U.S. PATENT DOCUMENTS

| | | | |
|---|---|---|---|
| 6,675,609 B2 | 1/2004 | Takeuchi et al. | |
| 6,925,835 B2 * | 8/2005 | Nishijima | F25B 49/027 62/500 |
| 8,776,539 B2 | 7/2014 | Verma et al. | |
| 9,217,590 B2 * | 12/2015 | Cogswell | F25B 41/00 |
| 10,465,983 B2 | 11/2019 | Ladd | |
| 10,724,771 B2 * | 7/2020 | Hellmann | F25B 1/10 |
| 10,823,461 B2 * | 11/2020 | Hellmann | F25B 9/008 |
| 11,209,191 B2 * | 12/2021 | Wang | F25B 9/008 |
| 11,215,386 B2 * | 1/2022 | Hellmann | F25B 43/006 |
| 11,365,913 B2 * | 6/2022 | Xu | F25B 5/02 |
| 11,408,647 B2 * | 8/2022 | Cogswell | F25B 40/04 |
| 2007/0000262 A1 * | 1/2007 | Ikegami | F25B 41/00 62/170 |
| 2011/0005268 A1 * | 1/2011 | Oshitani | F25B 41/00 62/500 |
| 2012/0167601 A1 * | 7/2012 | Cogswell | F25B 41/22 62/115 |

FOREIGN PATENT DOCUMENTS

| | | | | |
|---|---|---|---|---|
| JP | 2014190581 A | | 10/2014 | |
| WO | WO-2012074578 A2 * | | 6/2012 | ............... F04D 7/00 |
| WO | WO-2016004988 A1 * | | 1/2016 | ............... F25B 1/10 |

OTHER PUBLICATIONS

Athina Nickitas-Etienne, International Preliminary Report on Patentability, PCT Application No. PCT/US2020/062972, dated Jun. 16, 2022, 7 pages, International Bureau, Geneva Switzerland.

* cited by examiner

SYSTEMS AND METHODS FOR IMPLEMENTING EJECTOR REFRIGERATION CYCLES WITH CASCADED EVAPORATION STAGES

CROSS-REFERENCE TO RELATED APPLICATIONS

This application is a U.S. Nation Stage Application of PCT Patent Application Serial No. PCT/US20/62972, which was filed on Dec. 3, 2020 and claims priority to U.S. Provisional Application No. 62/943,542, which was filed on Dec. 4, 2019, each of which is incorporated herein by reference. This application and U.S. Pat. Nos. 10,514,201, 10,533,793, 10,465,983 and 10,514,202, which are incorporated herein by reference, are commonly assigned to Bechtel Hydrocarbon Technology Solutions, Inc.

FIELD OF THE DISCLOSURE

The present disclosure generally relates to systems and methods for implementing ejector refrigeration cycles with cascaded evaporation stages. More particularly, the present disclosure utilizes a pump to optimize operation of the ejector and eliminate the need for a compressor between the evaporation stages.

BACKGROUND

Ejector refrigeration cycles offer performance advantages compared to traditional cascaded refrigeration cycles. One example of a conventional ejector refrigeration cycle system 100 with two evaporation pressures is illustrated by the schematic diagram in FIG. 1.

Figure 1:
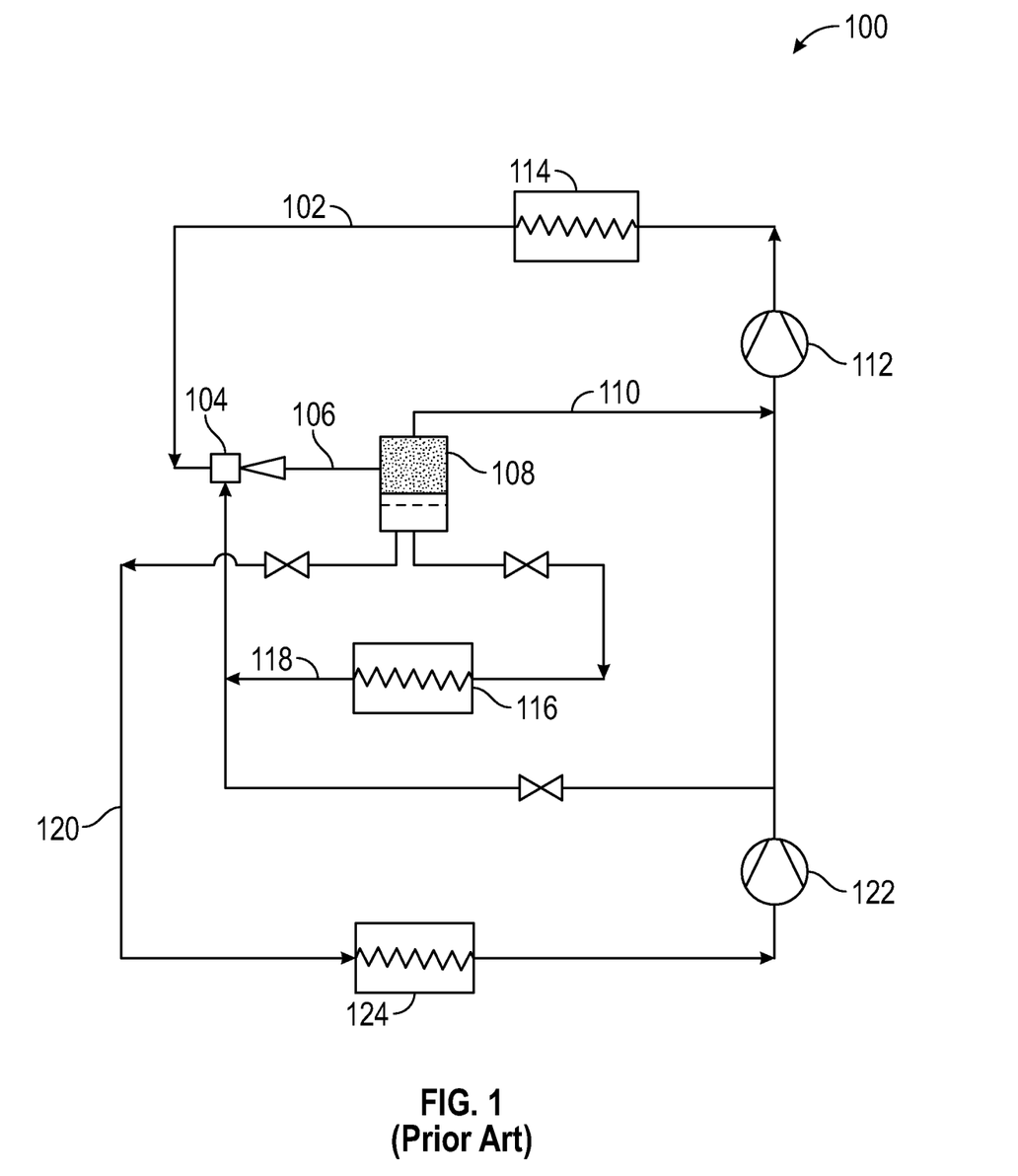
FIG. 1 is a schematic diagram illustrating a conventional ejector refrigeration cycle system.

In FIG. 1, condensed liquid refrigerant in line 102 is transferred to the motive nozzle inlet of an ejector 104 where it is expanded and accelerated to a lower pressure and partially vaporized. Vaporized refrigerant from a first evaporative heat exchanger 116 is transferred through line 118 to the suction nozzle of the ejector 104. Through the entrainment of suction flow in line 118 by the acceleration of the motive flow in line 102, the ejector 104 discharges these two flows at a pressure higher than the pressure in the heat exchanger 116 in a two-phase state after mixing and diffusing, resulting in a smaller pressure ratio across a compressor 112 and thus, reducing the power consumption of the compressor 112. The partially vaporized flow is collected in a flash tank 108 utilized for phase separation of the two-phase flow. Vapor in line 110 from the flash tank 108 is recompressed in the compressor 112 and subsequently condensed in a condensing heat exchanger 114 with heat rejection to an external heat sink. Liquid from the flash tank 108 is evaporated in the heat exchanger 116 used to cool an external stream. An additional chilling stage is achieved by expanding liquid from the flash tank 108 to a low-pressure stage in line 120 where the flow is evaporated in a second evaporative heat exchanger 124. Vaporized refrigerant is then compressed to higher stages in a booster compressor 122.

A pressure differential between the motive flow in line 102 upstream of the ejector 104 and the suction flow in line 118 is what allows the ejector 104 to operate. A certain difference in pressure between the high side (motive) and low side (suction) is needed for the ejector 104 to perform efficiently. Because of this, many manufacturers will use multiple ejectors in parallel or an ejector that is adjustable to accommodate for changes in the upstream motive pressure. As a result, high-side pressure control is a limiting aspect that makes ejector refrigeration cycles less suitable for operational flexibility over a wide range of operating conditions that can impact the performance of the ejector, leading to a significantly reduced coefficient of performance. Additionally, to achieve two evaporation pressures, either a booster compressor between the two evaporator heat exchangers 116 and 124 would be required or the medium temperature at the outlet of heat exchanger 116 would need to be expanded down to the lower evaporating pressure at the outlet of heat exchanger 124. The addition of a booster compressor is more efficient than expanding the outlet flow from heat exchanger 116 because a single compressor would have a higher-pressure ratio to overcome, and thus, consume more power. Because the additional booster compressor 122 also increases the overall power consumption of the cycle, alternative means of compressing the working fluid to achieve the pressure differential between the heat exchangers 116 and 124 may be preferred and multiple ejectors may be required to maintain optimal operational performance and energy efficiency.

BRIEF DESCRIPTION OF THE DRAWINGS

The present disclosure is described below with references to the accompanying drawings in which like elements are referenced with like numerals and which.

DETAILED DESCRIPTION OF THE ILLUSTRATIVE EMBODIMENTS

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. All streams described are carried by physical lines. To the extent that temperatures and pressures are referenced in the following description, those conditions are merely illustrative and are not meant to limit the disclosure.

The systems and methods disclosed herein thus, improve conventional ejector refrigeration cycles with the addition of a pump positioned downstream from the condensing heat exchanger to eliminate the need for a booster compressor and achieve the pressure differential between the evaporative heat exchangers.

In one embodiment, the present disclosure includes a refrigeration system, which comprises: i) an ejector in fluid communication with a first evaporative heat exchanger, a pump and a flash drum, the ejector positioned downstream of the first evaporative heat exchanger and the pump and positioned upstream of the flash drum; ii) the first evaporative heat exchanger in fluid communication with the flash drum and positioned downstream of the flash drum; iii) a second evaporative heat exchanger in fluid communication with the flash drum and a single compressor, the second evaporative heat exchanger positioned upstream of the compressor and downstream of the flash drum; iv) the compressor in fluid communication with the flash drum and positioned downstream of the flash drum; and v) a condensing heat exchanger in fluid communication with the compressor and the pump, the condensing heat exchanger positioned downstream of the compressor and upstream of the pump.

In another embodiment, the present disclosure includes a refrigeration method, which comprises: i) pumping a condensed liquid refrigerant from a first heat exchanger to an ejector at a higher pressure than a pressure at the first heat exchanger; ii) ejecting the liquid refrigerant from the ejector as a two-phase refrigerant to a flash drum; iii) separating the two-phase refrigerant in the flash drum into a liquid refrigerant and a vapor refrigerant; iv) transferring a portion of the liquid refrigerant from the flash drum through a second heat exchanger to the ejector as an evaporated refrigerant with an evaporation pressure; v) transferring another portion of the liquid refrigerant from the flash drum through a third heat exchanger to a compressor as a vaporized refrigerant at another evaporation pressure; and vi) transferring a compressed refrigerant from the compressor to the first heat exchanger.

Figure 2:
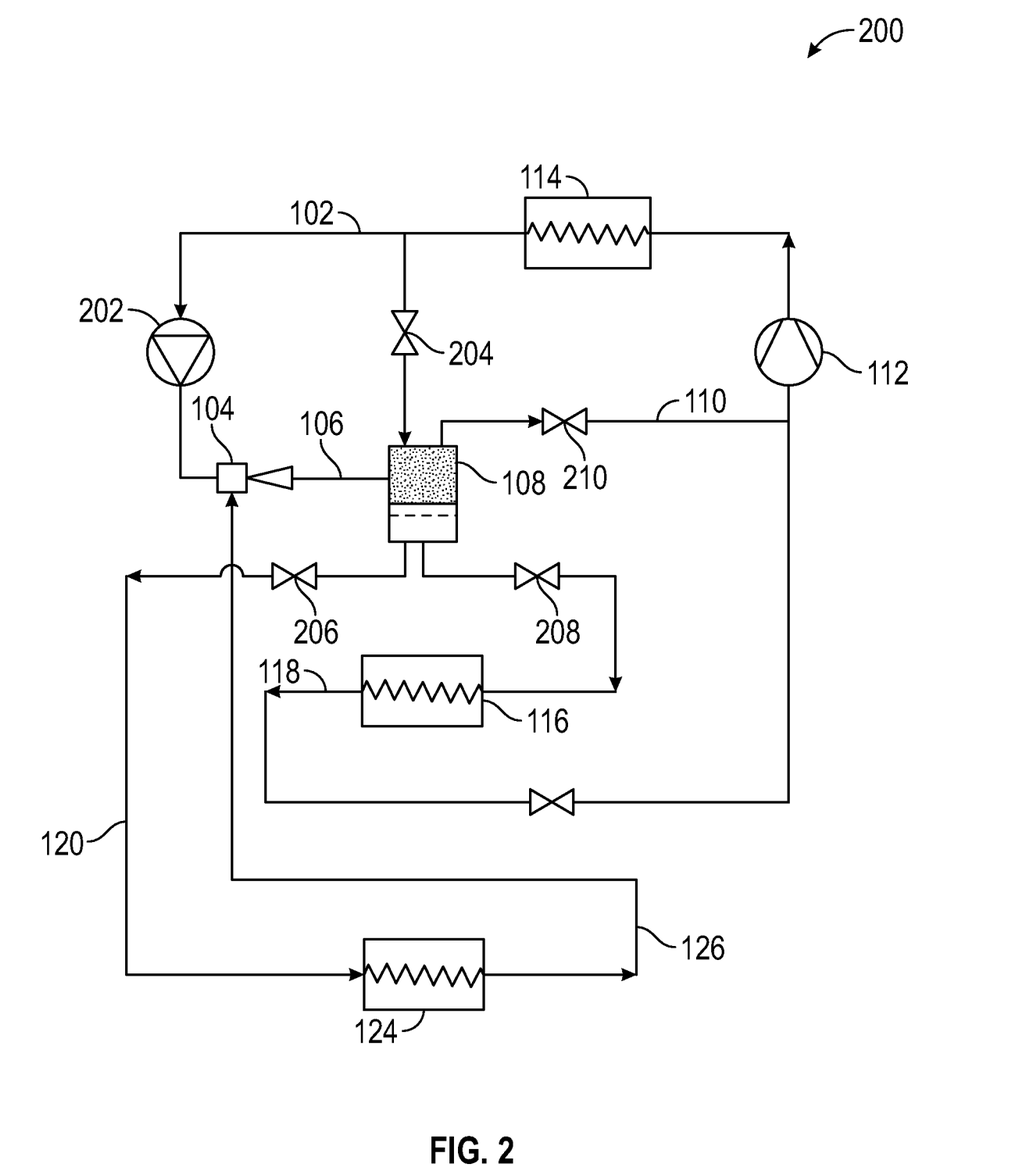
FIG. 2 is a schematic diagram illustrating an embodiment of an improved ejector refrigeration cycle system with two evaporation pressures.

In FIG. 2, a schematic diagram illustrates an embodiment of an improved ejector refrigeration cycle system 200 with two evaporation pressures. A condensed liquid refrigerant in line 102 from the condensing heat exchanger 114 is transmitted to a refrigerant pump 202. The condensed liquid refrigerant is pumped to a higher pressure, with pressure ratios on the order of about 1.14 to about 5 and in accordance with an acceptable entrainment ratio, defined as the ratio of suction nozzle mass flow rate to the motive nozzle mass flow rate, for the ejector 104. The preferred acceptable entrainment ratio is greater than about 0.3 to maximize ejector efficiency and system capacity. An electronic expansion valve 204 downstream of the condensing heat exchanger 114 ensures operational stability by facilitating the ability to bypass the ejector 104 and helps control the pressure in the condensing heat exchanger 114. Refrigerant is transmitted from the ejector 104 through line 106 to the flash tank 108. Following phase separation in the flash tank 108, the liquid flows from the bottom of flash tank 108 are expanded to two different evaporation pressures corresponding with heat exchangers 116 and 124. One level is obtained through a medium temperature evaporative heat exchanger 116. The second level is obtained at the lowest temperature evaporative heat exchanger 124. The evaporated refrigerant from the evaporative heat exchanger 116 is transferred to the compressor 112 through line 118. The vaporized refrigerant from the low temperature evaporative heat exchanger 124 is transmitted to the suction nozzle of the ejector 104 through line 126.

The ejector refrigeration cycle system in FIG. 2 is most beneficial operating in cooling mode due to increased pressure differentials across the system resulting in larger amounts of available expansion work recovery. As a result, heat rejection would occur in two ways. The first way would be to reject heat to the atmosphere using the condensing heat exchanger 114. The second way would be to reject heat to a working fluid as done in a hydronic heating system through the condensing heat exchanger 114. In most applications, the pressure in the condensing heat exchanger 114 of the cycle will be dictated by the temperature of the heat sink to which heat is rejected. As such, the potential efficiency benefits of the ejector refrigeration cycle system in FIG. 2 are higher in climates where the ambient condition is extreme and/or fluctuates broadly over a range of conditions. The heat sources to evaporative heat exchangers 116 and 124 may come in the form of air or a secondary water loop. This water loop will reject heat to the vapor compression cycle and circulate through the building absorbing loads from room units, which can be controlled individually through local fan speeds. This water loop acts as a buffer for the vapor compression cycle from thermal excitations in rooms and other areas due to its significant thermal inertia. This reduction in vapor compression system excitation is a benefit for efficiency, as system stability almost always results in more efficient operation. Furthermore, the complicated fluid and gas dynamics that occur within a two-phase ejector can be susceptible to instabilities, making this advantage even more notable.

Utilizing a pump as a method to control the ejector inlet conditions will enable a fixed-geometry ejector to operate at or near its design condition over a range of operating conditions. While researchers have been unable to develop a variable-geometry ejector with an isentropic efficiency competitive to that of a fixed-geometry ejector, off-design operating conditions impart inefficiencies as well. As such, the ejector refrigeration cycle system in FIG. 2 addresses both issues. Provided the pump 202 has a higher isentropic efficiency than the compressor 112 within the system and is able to modulate the ejector 104 inlet condition to an optimum, this design will provide an increase in efficiency. As the isentropic efficiency of the pump 202 and the compressor 112 are largely a function of pressure ratio, the combination could be selected and designed to operate over a smaller range of pressure ratios, despite being over a broader range of ambient temperatures than standard applications of either component, increasing the possibility of higher isentropic efficiencies and thus, increased system efficiency.

Figure 3:
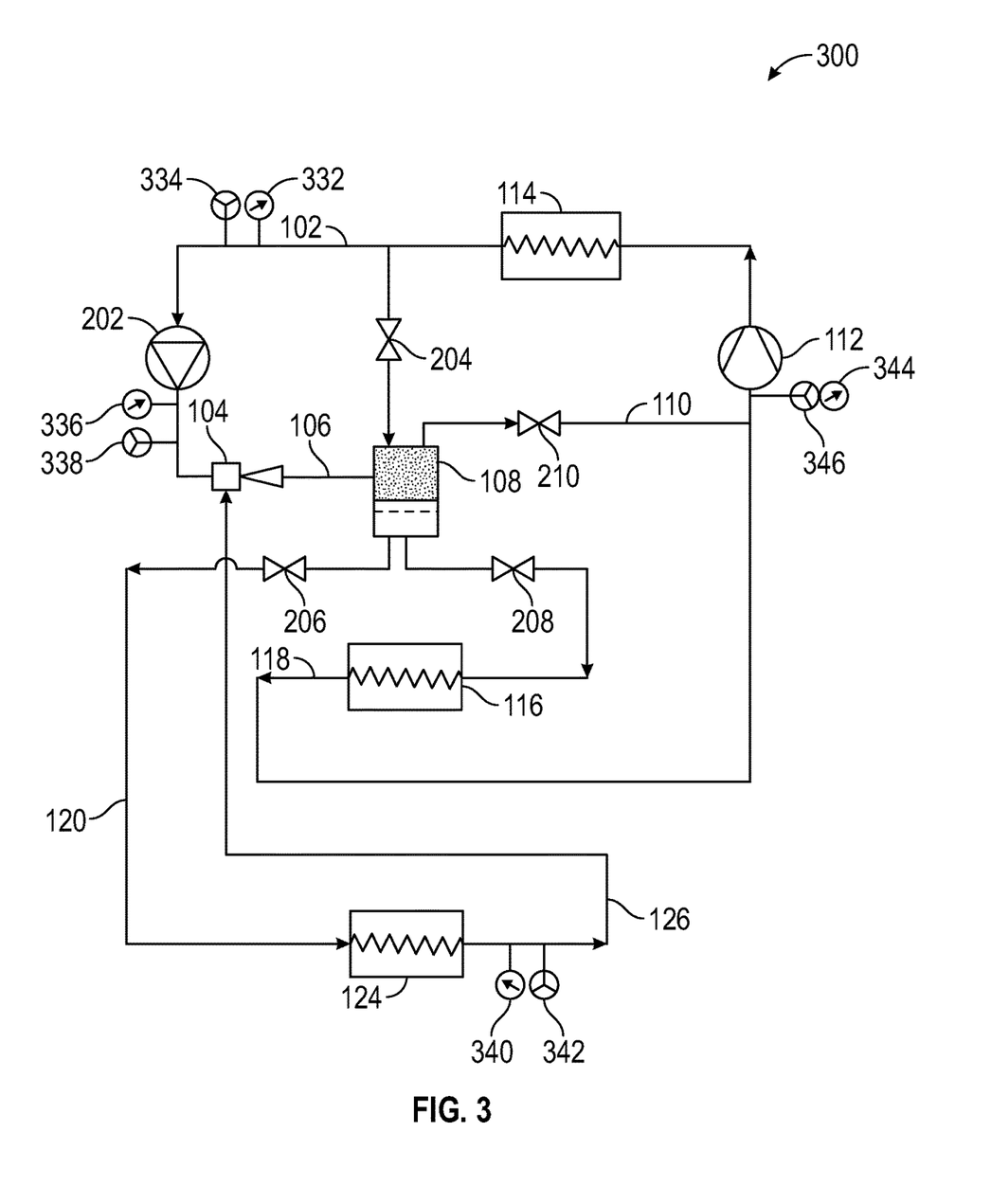
FIG. 3 is a schematic diagram illustrating an embodiment of an improved ejector refrigeration cycle system with two evaporation pressures and sensors for adjustable operation.

Referring now to FIG. 3, a schematic diagram illustrates an embodiment of an improved ejector refrigeration cycle system 300 with two evaporation pressures and sensors for adjustable operation. The electronic expansion valve 204 is modulated to establish a stable pressure differential between the medium temperature evaporative heat exchanger 116 and the condensing heat exchanger 114, as well as modulating the liquid level in the flash tank 108. A target compressor suction superheat of 10 K at the compressor 112 suction port will be maintained through modulation of valves 210 and 208. The saturated vapor flow from the flash tank 108 will mix with the medium temperature evaporator outlet flow in line 118, which will decrease and possibly eliminate superheat at the suction port to the compressor 112. This needs to be actively rectified via decreasing the orifice diameter of valve 208 and increasing the orifice diameter of valve 210. If the system is designed and charged correctly, this will represent the design operating condition for the compressor 112 and will also result in subcooled liquid at the outlet of the condensing heat exchanger 114 of 5 K. These two temperature differentials (superheat and subcool) result in the target balance between utilization of a condenser and evaporator surface area, as well as compressor performance, which is consistent with standard refrigeration applications. At the outlet of the condensing heat exchanger 114, flow will be flowing through the ejector 104 motive nozzle, which will also entrain flow from the lower temperature evaporative heat exchanger 124 through line 126. The pressure lift across the ejector 104 will then facilitate the differential in pressure between the two evaporative heat exchangers 116, 124. This is the goal of the system 300. To maximize this pressure differential, the electronic expansion valve 204 should be closed completely during ejector operation.

Ideally, the system 300 requires minimal temperature and pressure measurement feedback to minimize cost and complexity, such that the sensors focus solely on retaining compressor suction superheat. However, in order to ensure that the pump 202 and ejector 104 combination is operating at the optimal condition, the lower temperature evaporator 124 outlet state and the condensing heat exchanger 114 outlet state need to be considered as well. There is no need for a flow rate measurement in the system 300, as the compressor maps can be utilized in conjunction with sensors and power draw measurement that will already be in place to predict the mass flow rate. To control the flow rates in the system 300, both the compressor 112 and the pump 202 will have a dedicated variable frequency drive (VFD) to modulate their operating frequency, enabling part-load operation when the cooling capacity required of the system 300 is less than the design point. The only other method of active control within the system 300 will be modulation of electronic expansion valves as previously discussed.

The electronic expansion valve 204 may be used during startup as a bypass to the ejector 104 to ensure control of the system 300, and may be closed during steady operation to allow 100% of the condensing heat exchanger 114 outlet mass flow to enter the ejector 104 to maximize the ejector 104 work recovery. The electronic expansion valve 208 between the flash tank 108 and the medium temperature evaporative heat exchanger 116 will control the outlet superheat temperature in line 118. Controlling the outlet superheat temperature in line 118 using flow control valve 208 will contribute to control of the superheat at the compressor suction port, which is measured by pressure sensor 344 and sensor 346 tuned with the thermo-physical properties of the primary working fluid to represent superheat. Valve 210 may work in tandem with valve 208 due to the mixing of flows in line 110 and line 118 before entering compressor suction to maintain compressor suction superheat and to ensure an equal pressure drop across valves 208 and 210 so that significant variation in flash tank 108 liquid level does not occur. Valves 208 and 210 may work with valve 206 and electronic expansion valve 204 to ensure that the liquid level in the flash tank 108 remains at a safe level. The liquid level can be assessed by the rate of change of superheat values at the outlets of the evaporative heat exchangers 116, 124.

For example, if the superheat values increase rapidly, this suggests that the liquid in the flash tank 108 has disappeared, thus significantly increasing the inlet flow quality at the evaporative heat exchangers 116, 124. In this case, the valve 210 between the flash tank 108 and the compressor 112 will open and in tandem the valve 204 will open to pull more sub-cooled liquid from the condensing heat exchanger 114 into the flash tank 108. The electronic expansion valve 206 between the flash tank 108 and the low temperature evaporative heat exchanger 124 will control the outlet superheat and receives inputs of the temperature and pressure from sensor 342 and 340, respectively, at the outlet of the low temperature evaporative heat exchanger 124, just as the compressor suction superheat is measured. The low temperature evaporative heat exchanger 124 outlet state will have a target superheat of 5 K to balance high ejector efficiency while retaining as high of an evaporation pressure as possible for a given heat source temperature. A combination of the sensors 332, 334, 336, 338, 340, 342, and/or 344, 346 and the compressor power may be used to control the pump speed. Given that the fluid on the outlet of the low temperature evaporative heat exchanger 124 represents the ejector 104 suction nozzle inlet state and the pressure measured by sensor 336 represents the motive nozzle inlet pressure, the outlet quality of the ejector 104 can be calculated via empirically derived relations. Conservation of mass is then applied using the compressor 112 flow rate, and all operating parameters of the ejector 104 are known, allowing the pump 202 to act to vary the motive inlet state to an optimal condition.

For safe initialization of pump 202, the power measurement of compressor 112 in conjunction with superheat from sensors 344 and 346 can be used to calculate the mass flow rate passing through the condensing heat exchanger 114. Sensors 332 and 334 can then be used to calculate the density of the pump 202 inlet state, which can then be coupled with the mass flow rate calculation and the known pump displacement volume to determine an initial pump speed. This pump speed would be as close to matching the mass flow rate of the system 300 as possible to minimize cycle excitation as well as the chance of cavitation in the pump 202 suction port. Upon starting the pump 202, the calculated speed should be entered into the VFD, and immediately following the pump startup the valve 204 should be completely closed to minimize the chance of a bypass occurring. Once operational, the pump speed is directly proportional to pump 202 discharge pressure and the two-phase quality at the ejector 104 diffuser outlet in line 106. The pump discharge pressure can be measured with sensor 336 and if a maximum pressure is exceeded the valve 204 should be opened and the pump 202 speed reduced. The variation in two-phase quality in line 106 will impact the quality in the flash tank 108 and therefore, the liquid level. As the ejector 104 outlet quality increases the liquid level in the flash tank 108 will decrease, thus necessitating closing of valves 208 and 206 and opening valve of 210 to retain a constant liquid level. All of these changes should be made in small increments, slowly, as the combination of charge, temperature, and pressure propagation throughout the system 300 may take time to settle and can become unstable if large adjustments are made too quickly.

Figure 4:
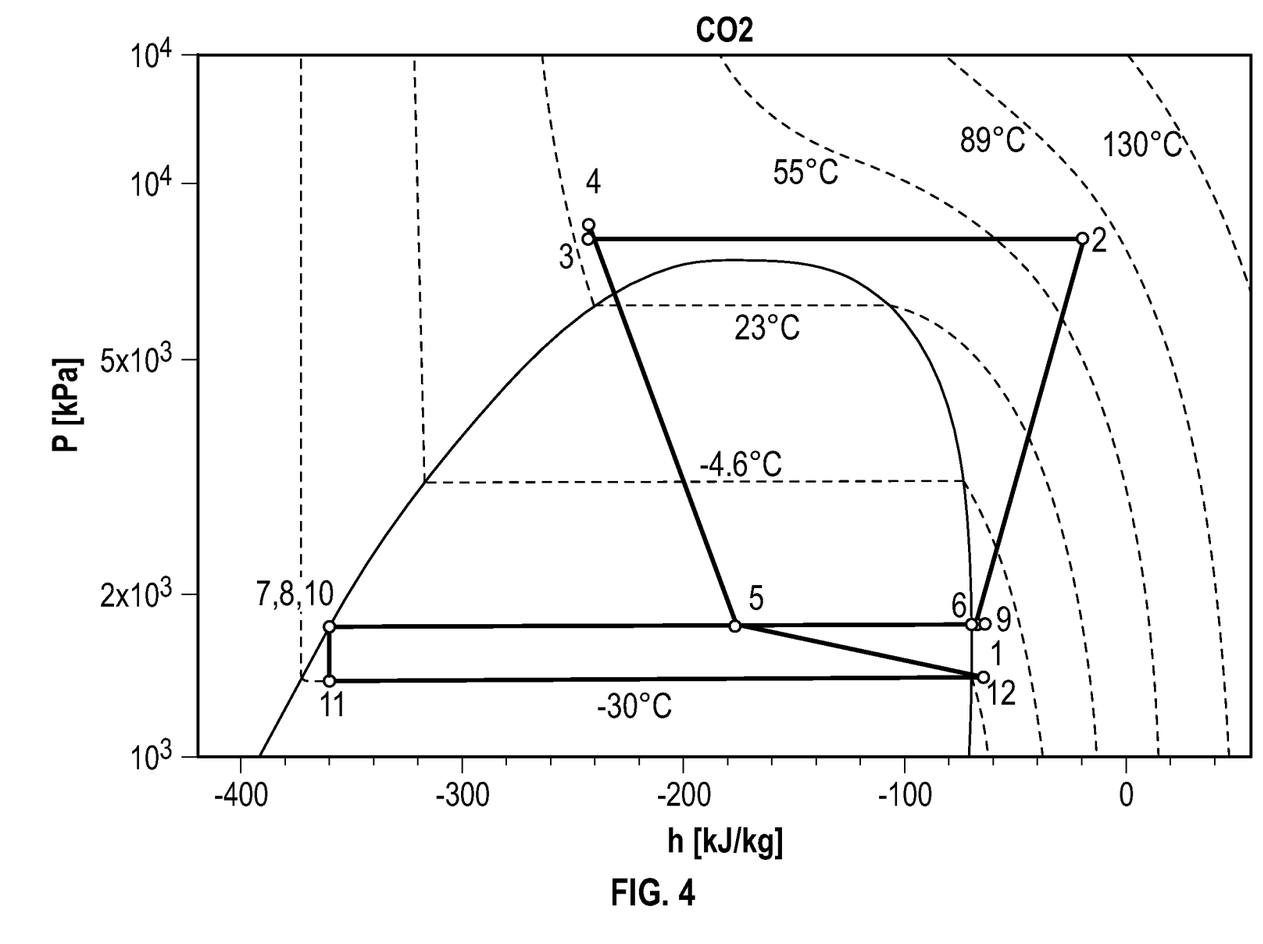
FIG. 4 is a P-h diagram of the ejector refrigeration cycle system illustrated in FIG. 2 using carbon dioxide (R744) as the refrigerant.
Figure 5:
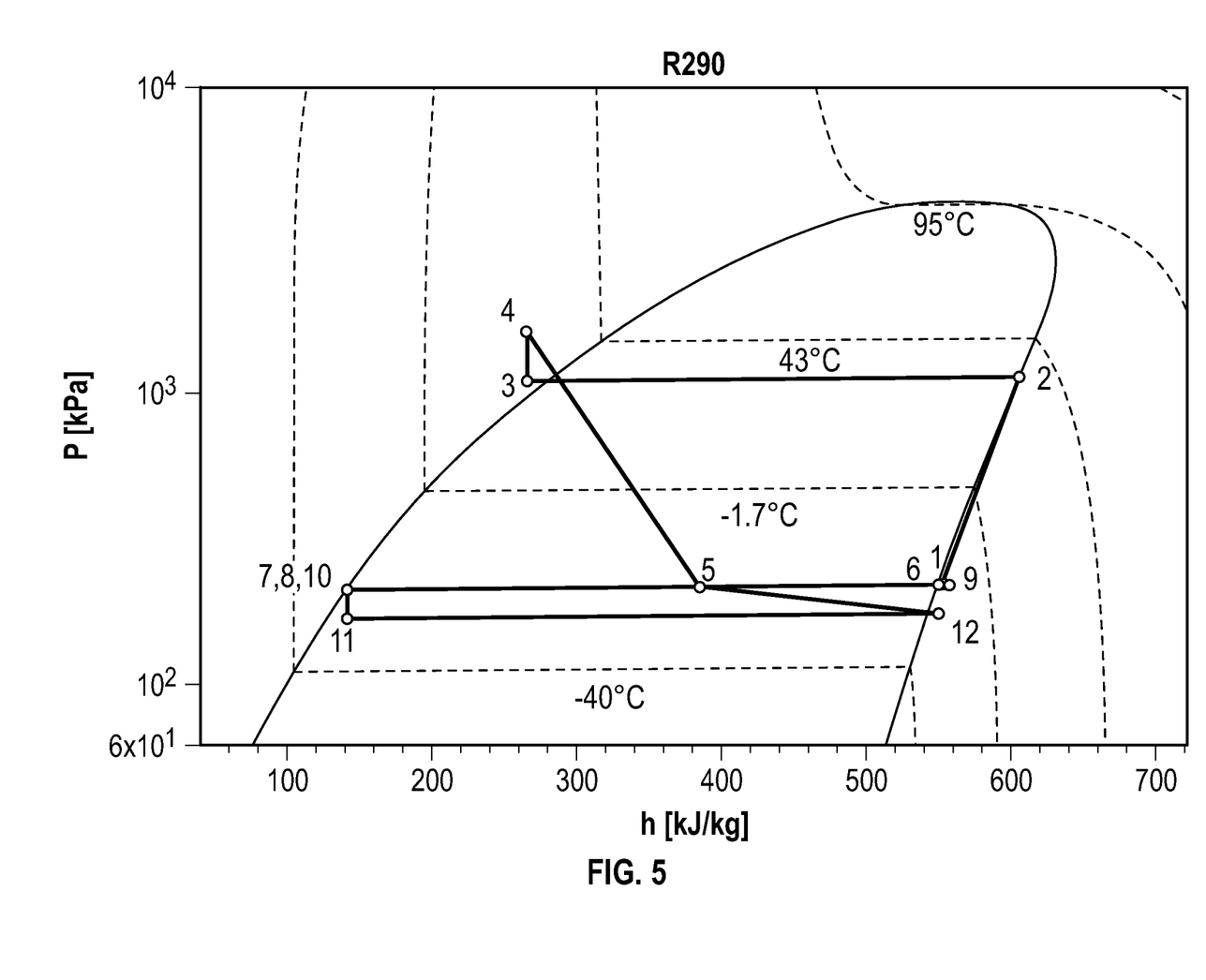
FIG. 5 is a P-h diagram of the ejector refrigeration cycle system illustrated in FIG. 2 using propane (R290) as the refrigerant.
Figure 6:
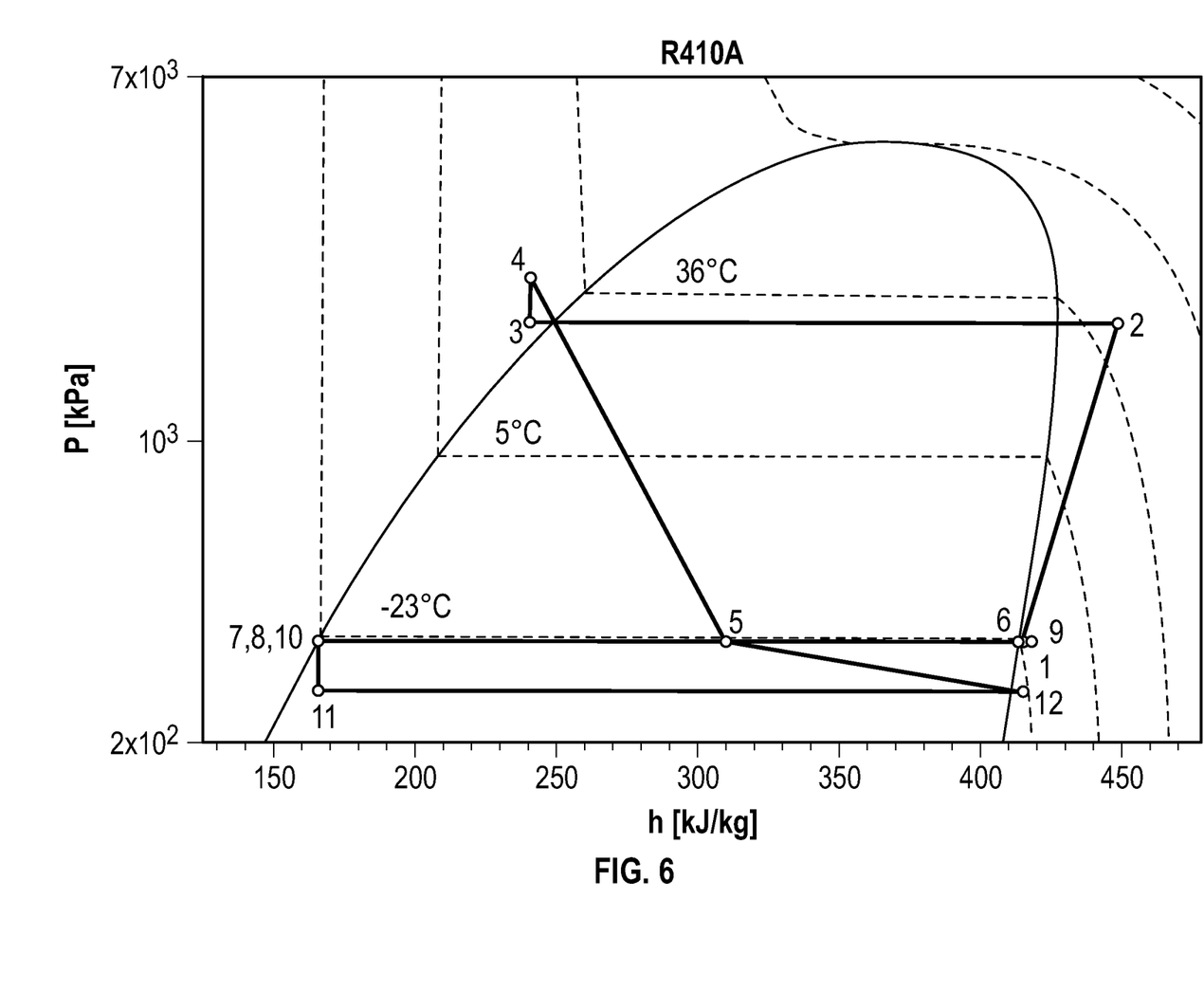
FIG. 6 is a P-h diagram of the ejector refrigeration cycle system illustrated in FIG. 2 using R410A as the refrigerant.

The pressure-enthalpy (P-h) diagrams in FIGS. 4-6 illustrate the potential performance of the ejector refrigeration cycle system in FIG. 2. The notable feature is the transition between state 3 and state 5 on each plot. This transition thermodynamically illustrates how a small increase in pressure, shown by states 3 and 4, can allow the ejector 104 to operate in such a way that a lower stage compressor is not required to facilitate stable operation of the refrigeration cycle for multi-stage condensing. The transition between state 3 and 5 also illustrates the benefit of employing a pump 202 in combination with the ejector 104. By doing so, state 5 is not located close to the saturated liquid line, as would be expected in a typical vapor compression cycle and is instead brought closer to the saturated vapor line. While FIGS. 4-6 are logarithmic pressures—specific P-h diagrams used to illustrate projected operation of certain working fluids of the ejector refrigeration cycle system in FIG. 2—this does not preclude other refrigerants from being used in place of the illustrated refrigerants for the system.

While the present disclosure has been described in connection with presently preferred embodiments, it will be understood by those skilled in the art that it is not intended to limit the disclosure to those embodiments. Preexisting ejector refrigeration cycles may be retrofitted or modified according to the disclosure herein, which may also be implemented in any other refrigeration process employed in an enclosed structure for heating or cooling to achieve similar results. It is therefore, contemplated that various alternative embodiments and modifications may be made to the disclosed embodiments without departing from the spirit and scope of the disclosure defined by the appended claims and equivalents thereof.

The invention claimed is:

1. A refrigeration system, which comprises:
an ejector in fluid communication with a first evaporative heat exchanger, a pump and a flash drum, the ejector positioned downstream of the first evaporative heat exchanger and the pump and positioned upstream of the flash drum;
the first evaporative heat exchanger in fluid communication with the flash drum and positioned downstream of the flash drum;
a second evaporative heat exchanger in fluid communication with the flash drum and a single compressor, the second evaporative heat exchanger positioned upstream of the compressor and downstream of the flash drum;
the compressor in fluid communication with the flash drum and positioned downstream of the flash drum; and
a condensing heat exchanger in fluid communication with the compressor and the pump, the condensing heat exchanger positioned downstream of the compressor and upstream of the pump.

2. The refrigeration system of claim 1, further comprising an expansion valve in fluid communication with the condensing heat exchanger and the flash drum, the expansion valve positioned downstream of the condensing heat exchanger and upstream of the flash drum.

3. The refrigeration system of claim 1, further comprising at least one sensor for detecting a temperature and a pressure in a line connecting the pump and the ejector.

4. The refrigeration system of claim 1, further comprising at least one sensor for detecting a temperature and a pressure in a line connecting the condensing heat exchanger and the pump.

5. The refrigeration system of claim 1, further comprising at least one sensor for detecting a temperature and a pressure in a line connecting the compressor with the flash drum and the second evaporative heat exchanger.

6. The refrigeration system of claim 1, further comprising at least one sensor for detecting a temperature and a pressure in a line connecting the first evaporative heat exchanger and the ejector.

7. The refrigeration system of claim 2, further comprising another expansion valve in fluid communication with the flash drum and the compressor, the another expansion valve downstream of the flash drum and upstream of the compressor.

8. A refrigeration method, which comprises:
pumping a condensed liquid refrigerant from a first heat exchanger to an ejector at a higher pressure than a pressure at the first heat exchanger;
ejecting the liquid refrigerant from the ejector as a two-phase refrigerant to a flash drum;
separating the two-phase refrigerant in the flash drum into a liquid refrigerant and a vapor refrigerant;
transferring a portion of the liquid refrigerant from the flash drum through a second heat exchanger to the ejector as an evaporated refrigerant with an evaporation pressure;
transferring another portion of the liquid refrigerant from the flash drum through a third heat exchanger to a compressor as a vaporized refrigerant at another evaporation pressure; and
transferring a compressed refrigerant from the compressor to the first heat exchanger.

9. The refrigeration method of claim 8, further comprising adjusting a flow of the condensed liquid refrigerant from the first heat exchanger to the ejector with an expansion valve positioned between the first heat exchanger and the flash drum.

10. The refrigeration method of claim 8, further comprising adjusting a flow of the condensed liquid refrigerant from the first heat exchanger to the ejector based on a temperature and a pressure of the condensed liquid refrigerant leaving the first heat exchanger.

11. The refrigeration method of claim 9, further comprising adjusting the expansion valve based on a pressure of the condensed liquid refrigerant near the ejector.

12. The refrigeration method of claim 8, further comprising adjusting a flow of the portion of the liquid refrigerant from the flash drum through the second heat exchanger with an expansion valve positioned between the flash drum and the second heat exchanger.

13. The refrigeration method of claim 12, further comprising adjusting the expansion valve based on a temperature and a pressure of the evaporated refrigerant leaving the second heat exchanger.

14. The refrigeration method of claim 8, further comprising adjusting a flow of the another portion of the liquid refrigerant from the flash drum through the third heat exchanger with an expansion valve positioned between the flash drum and the third heat exchanger.

15. The refrigeration method of claim 14, further comprising adjusting a flow of the vapor refrigerant from the flash drum to the compressor with another expansion valve positioned between the flash drum and the compressor.

16. The refrigeration method of claim 15, further comprising adjusting the expansion valve and the another expansion valve based on a temperature and a pressure of the vaporized refrigerant leaving the third heat exchanger near the compressor.

17. The refrigeration method of claim 8, wherein the another evaporation pressure is higher than the evaporation pressure.

* * * * *